(12) United States Patent
Nordstrom

(10) Patent No.: US 8,845,270 B2
(45) Date of Patent: Sep. 30, 2014

(54) ROTOR ASSEMBLY

(75) Inventor: Carl David Nordstrom, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1027 days.

(21) Appl. No.: 12/879,150

(22) Filed: Sep. 10, 2010

(65) Prior Publication Data

US 2012/0063880 A1 Mar. 15, 2012

(51) Int. Cl.
| | |
|---|---|
| *B64C 11/20* | (2006.01) |
| *B64C 11/02* | (2006.01) |
| *B64C 11/48* | (2006.01) |
| *B64D 27/02* | (2006.01) |

(52) U.S. Cl.
CPC .................. *B64C 11/48* (2013.01); *B64C 11/02* (2013.01); *Y02T 50/66* (2013.01); *B64C 11/20* (2013.01); *B64D 2027/026* (2013.01)
USPC ............................................. 415/83; 415/140

(58) Field of Classification Search
USPC ............ 415/83, 115, 119, 140; 416/131, 140, 416/224, 239
See application file for complete search history.

(56) References Cited

U.S. PATENT DOCUMENTS

| | | | | |
|---|---|---|---|---|
| 2,478,252 A | * | 8/1949 | Dean .............................. | 416/147 |
| 2,526,409 A | * | 10/1950 | Price ............................... | 416/37 |
| 2,627,927 A | * | 2/1953 | Mergen ........................... | 416/94 |
| 2,670,050 A | | 2/1954 | Enos | |
| 2,708,483 A | * | 5/1955 | Camping et al. ............... | 416/144 |
| 2,718,267 A | * | 9/1955 | Woolf et al. ................... | 416/239 |
| 2,729,297 A | * | 1/1956 | Felt ................................ | 416/239 |
| 2,745,501 A | * | 5/1956 | Blanchard, Jr. et al. ....... | 416/129 |
| 2,918,128 A | * | 12/1959 | Mallinckrodt ............ | 416/132 R |
| 3,148,733 A | * | 9/1964 | Drees et al. .................... | 416/114 |
| 3,768,933 A | | 10/1973 | Bouiller et al. | |
| 3,794,442 A | | 2/1974 | McMurtry | |
| 4,111,601 A | | 9/1978 | Richard | |
| 4,137,010 A | * | 1/1979 | Stroub ............................ | 416/51 |
| 4,171,183 A | | 10/1979 | Cornell et al. | |
| 4,431,375 A | * | 2/1984 | Carter et al. .............. | 416/132 B |
| 4,488,399 A | * | 12/1984 | Robey et al. .................... | 60/262 |

(Continued)

FOREIGN PATENT DOCUMENTS

| | | |
|---|---|---|
| EP | 2388191 | 11/2011 |
| WO | WO 2008/096124 | 8/2008 |
| WO | WO 2010/070066 | 6/2010 |

OTHER PUBLICATIONS

United Kingdom Search Report, GB 1115720.3, Rolls-Royce Corporation, Dec. 16, 2011.

*Primary Examiner* — Edward Look
*Assistant Examiner* — Sean J Younger
(74) *Attorney, Agent, or Firm* — Krieg DeVault LLP

(57) ABSTRACT

A rotor assembly is disclosed herein. The rotor assembly includes a hub disposed for rotation about an axis of rotation. The rotor assembly also includes at least one blade fixed with the hub for concurrent rotation with the hub. The at least one blade extends along a height axis radially outward from the hub with a root portion proximate to the hub at a first end of the height axis and an airfoil portion extending radially inward from a second end of the height axis opposite the first end. The rotor assembly also includes a sheath extending at least partially around the root portion. The sheath is pivotally engaged with the at least one blade to pivot about the height axis and allowed to weathervane to reduce noise.

15 Claims, 4 Drawing Sheets

(56) References Cited

U.S. PATENT DOCUMENTS

| | | | |
|---|---|---|---|
| 4,533,297 A * | 8/1985 | Bassett | 416/132 B |
| 4,582,013 A * | 4/1986 | Holland, Jr. | 114/39.3 |
| 4,738,589 A * | 4/1988 | Wright | 416/127 |
| 4,767,270 A | 8/1988 | Seidel | |
| 4,892,269 A * | 1/1990 | Greco et al. | 244/53 R |
| 4,913,623 A | 4/1990 | Schilling et al. | |
| 4,930,725 A | 6/1990 | Thompson et al. | |
| 5,096,382 A | 3/1992 | Gratzer | |
| 5,197,855 A | 3/1993 | Magliozzi et al. | |
| 5,242,265 A * | 9/1993 | Hora et al. | 416/26 |
| 6,059,532 A | 5/2000 | Chen et al. | |
| 7,559,191 B2 | 7/2009 | Parks | |
| 2009/0202357 A1* | 8/2009 | Stern | 416/97 R |
| 2010/0202892 A1 | 8/2010 | Perkinson | |

* cited by examiner

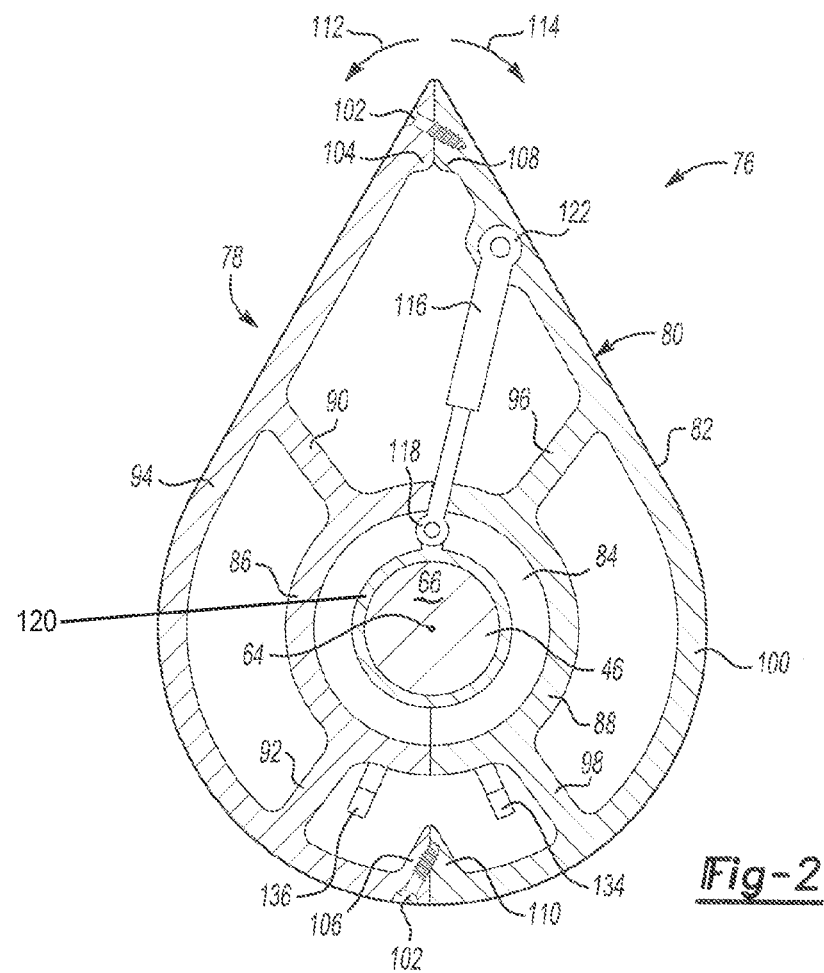

ROTOR ASSEMBLY

BACKGROUND OF THE INVENTION

1. Field of the Invention

The invention relates to a rotor assembly such as a propeller having a blade.

2. Description of Related Prior Art

U.S. Pat. No. 2,670,050 discloses a multi-blade propeller and cowling therefor. In brief, the invention of the '050 patent includes a small propeller hub having slender integral rigid spokes radiating therefrom, the spokes at their outer ends carrying sockets within which propeller blades are rotatably mounted for pitch change. The hub sockets, spaced circumferentially from one another, are joined by structural ties. The radially outward spacing of the hub sockets enables the use of a large multiplicity of blades which would not be possible, due to interference of the sockets with one another, if the sockets were disposed close to the axis of rotation. The spokes preferably may be solid structural members of minimum diameter, thereby offering minimum drag to air which may flow through the propeller hub inwardly of the blade sockets. A pitch change mechanism is incorporated in the central portion of the propeller hub and drive shafts lead therefrom to each blade in each socket, preferably, parallel to the hub spokes, to impart pitch changing rotation from the central hub to the remotely mounted blades. This propeller hub is particularly adapted for use with a so-called NACA type E cowling wherein a spinner, with an axial air entrance opening, is mounted upon the propeller and cooperates with a fixed cowling. Airflow through the spinner passes to a turbine engine or the like, across the spokes of the propeller hub, while the multiplicity of blades, exteriorly of the spinner, operate upon the air for propulsion of the aircraft. The multiple blade propeller made possible by this invention is particularly adapted for transonic flight speeds, but is not limited to such speeds. Fairings are referenced at 40 in FIGS. 2-4. The fairings are fixed to radially inner and outer portions of a spinner. Column 3, lines 15-21. The fairings can be pitched to an appropriate angle according to the direction of airflow through the spinner. Column 4, lines 45-50.

SUMMARY OF THE INVENTION

In summary, the invention is a rotor assembly. The rotor assembly includes a hub disposed for rotation about an axis of rotation. The rotor assembly also includes at least one blade fixed with the hub for concurrent rotation with the hub. The at least one blade extends along a height axis radially outward from the hub with a root portion proximate to the hub at a first end of the height axis and an airfoil portion extending radially inward from a second end of the height axis opposite the first end. The rotor assembly also includes a sheath extending at least partially around the root portion. The sheath is pivotally engaged with the at least one blade to pivot about the height axis to weathervane to a neutral position in all operating conditions.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a cross-sectional view directed radially inward and taken through a sheath and a blade spoke according to an embodiment of the invention;

FIG. 3 is a cross-sectional view in plane containing an axis of rotation of a rotor assembly and a height axis of a blade, the cross-section taken through a sheath and blade spoke according to an embodiment of the invention;

DETAILED DESCRIPTION OF EXEMPLARY EMBODIMENTS

Figure 1:
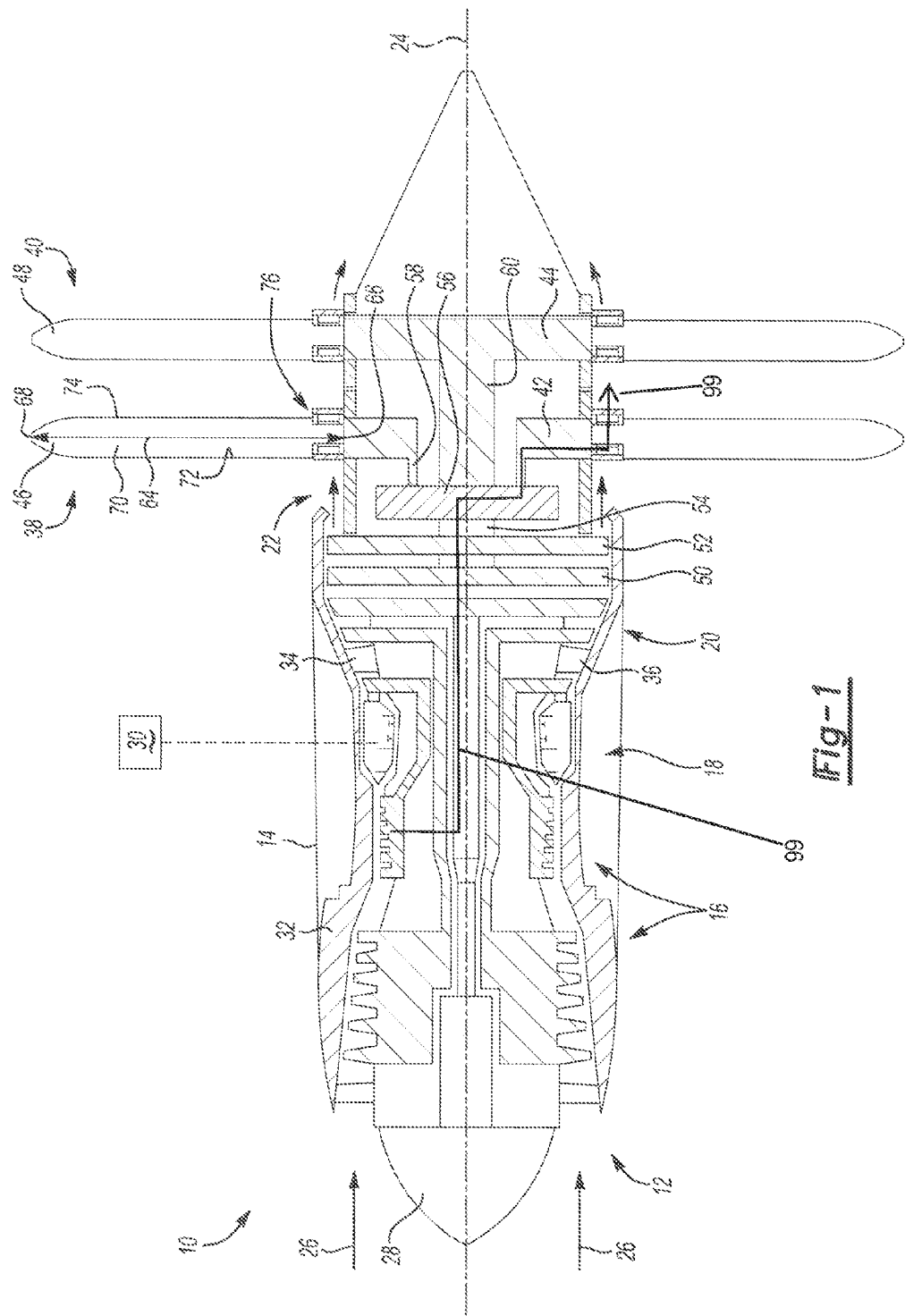
FIG. 1 is a schematic representation of a turbine engine incorporating an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as demonstrated by the exemplary embodiments described below, provides an arrangement that reduces noise. Typical open rotor and "propfan" designs to date, while providing impressive gains in propulsive efficiency, have generated substantial increases in noise. Embodiments of this invention can reduce one of the sources of open rotor or "propfan" noise, such as pressure pulses caused by high velocity exhaust stream(s) passing over a fixed geometry blade root aerodynamic shape. In most operating conditions, current blade roots exposed to the exhaust will not be aligned with the direction of flow and noise will be generated, from oscillating pressure gradients caused by the impingement of the exhaust flow on misaligned aerodynamic surfaces. Embodiments of the invention include a sheath, pivotally movable to align with the exhaust flow. This alignment will minimize the noise generated by exhaust gas/blade root interaction. Embodiments of the sheath can be filled with cooling air which can shield the blade root from hot exhaust gases, permitting the use of lower density materials for the blade. Additional noise abatement can be obtained if the cooling air is exhausted from the trailing edge of the fairing, to minimize wake formation.

FIG. 1 is a schematic representation of a turbine engine incorporating a first exemplary embodiment of the invention. A turbine engine 10 can include an inlet 12 and be housed in a nacelle 14. The turbine engine 10 can also include a compressor section 16, a combustor section 18, and a turbine section 20. The turbine engine 10 can also include an exhaust section 22. The compressor section 16, combustor section 18, turbine section 20, and exhaust section 22 can be arranged along a centerline axis 24. Components of the compressor section 16 and the turbine section 20 can rotate about the centerline axis 24. Fluid such as air can be drawn into the turbine engine 10 as indicated by the arrows referenced at 26.

The fluid enters the compressor section 16 from the inlet 12 and is compressed. A nose cone 28 can be proximate to the inlet 12 to gently direct air into the compressor section 16. The schematically shown compressor section 16 includes high and low pressure compressor sections. In some embodiments, a portion of the fluid can be diverted radially outside of the compressor section 16 and thereby become bypass flow. The compressed fluid emerging from the compressor section 16 is mixed with fuel from a fuel system 30 and ignited in the combustor section 18. Combustion gases exit the combustor section 18 and flow through the turbine section 20. Energy is extracted from the combustion gases in the turbine section 20.

The exemplary exhaust section 22 is an annular exhaust. Embodiments of the invention can be practiced in a lobed exhaust arrangement. U.S. Pat. Nos. 4,543,784 and 4,548,034 disclosed lobed exhaust systems and are hereby incorporated by reference for disclosure of lobed exhaust systems generally. Embodiments of the invention can also be practiced in exhaust arrangements such as shown in U.S. Pat. No. 5,197,855.

A turbine engine case 32 can encircle the core engine components (the compressor, combustor and turbine sections 16, 18, 20). The case 32 can support non-rotating structures such as compressor vanes (not shown) and turbine vanes. Exemplary turbine vanes are referenced at 34 and 36 and can be positioned to direct the flow of combustion gases to the turbine section 20. The combustion gases passing aft of the turbine section 20 are referenced by unnumbered arrows.

In the open rotor configuration shown in FIG. 1, power can be drawn from the free power turbine components to rotate rotor assemblies 38, 40. Each of the rotor assemblies 38, 40 respectively includes a hub portion 42, 44 and a plurality of blades, such as blades 46, 48. One or more of the blades 46, 48 can be formed as a composite of materials, such as a fiber-reinforced resin with a unidirectional carbon fiber in an epoxy matrix, or a woven fiberglass in an epoxy matrix. Various fiber-reinforced resins can be combined in a single composite blade, such as by laying up unidirectional carbon/epoxy as an interior body portion and woven fiberglass/epoxy as a ductile skin over the surface of interior body portion. In another embodiment, blades can be made from metal when design conditions dictate. In the exemplary embodiment, one or more free power turbines, such as turbines 50, 52 can drive a shaft 54. Combustion gases pass over and thereby cause rotation of the free power turbines 50, 52.

The shaft 54 can extend into a gear box 56. Respective drive shafts 58, 60 can extend from the gear box 56. The drive shaft 58 is fixed for rotation with the hub 42 of the rotor assembly 38. The drive shaft 60 is fixed for rotation with the hub 44 of the rotor assembly 40. In operation, the gears (not shown) of the gear box 56 can transmit the power input by the shaft 54 into counter-rotation of the rotor assemblies 38 and 40. The schematic illustration of FIG. 1 and FIG. 2 is a "pusher" open rotor configuration.

The blade 46 can extend along a height axis 64 from a root portion (or blade spoke) 66 at a first end to a tip 68 at a second end. As used herein, a "root portion" of the blade 46 is the portion of the blade 46 radially outward of the hub 42 and radially inward of the portion of the blade 46 that acts on air to propel an aircraft. An airfoil portion 70 can act on air to propel an aircraft and is defined between the tip 68 and the root portion 66. The blade 46 can define a wing cord extending between a leading edge 72 of the blade 46 and an aft edge 74. The leading edge 72 can be defined by a relatively sharp edge or can be formed differently.

The rotor assembly 38 also includes a sheath 76 extending at least partially around the root portion 66. As shown in FIG. 1, the sheath 76 can define an external surface of the turbine engine 10, which is part of an aircraft propulsion device. The sheath 76 is pivotally engaged with the at least one blade 46 to pivot about the height axis 64. FIG. 2 is a cross-sectional view directed radially inward toward the centerline axis 24. The plane of FIG. 2 is taken through the sheath 76 and the root portion 66 of the blade 46. The exemplary root portion 66 can be shaft-like in cross-section. In other embodiments of the invention, the root portion 66 can be non-circular in cross-section if desired.

The exemplary sheath 76 can be formed from first and second halves 78, 80 that mate with one another to define a substantially continuous outer surface 82. The first and second halves 78, 80 can be respectively mountable on opposite sides of the root portion 66. The outer surface 82 can be teardrop shaped in cross-section. A bearing or bushing 84, being a unitary structure or made up of two halves, can be positioned between the sheath 76 and the blade 46. Each of the halves 78, 80 can include respective collar portions 86, 88 that cooperate to encircle the bushing 84. For the half 78, support webs 90, 92 can extend between the collar portion 86 and a shell portion 94. The shell portion 94 defines part of the outer surface 82. For the half 80, support webs 96, 98 can extend between the collar portion 88 and a shell portion 100. The shell portion 100 defines part of the outer surface 82. Different kinds of material can be used to form the sheath 76. The material could be a metal, such as a steel, titanium, or nickel alloy. But there could be other options, such as possibly ceramic matrix composites (CMCs).

During assembly, the halves 78, 80 can be brought together around the root portion 66 and held together with fasteners 102 passing through bosses 104, 106, 108, 110 integrally formed with the shell portions 94, 100. It is noted that the sheath 76 discussed above and shown in FIG. 2 is an example and not the only form of sheath for embodiments of the invention. In other embodiments, the sheath can be a unitary structure, wherein the blade would be inserted into the sheath. Two or more piece sheaths can also be used if blade geometry does not permit the insertion through a one-piece sheath. It is noted that the blade can be assembled onto the root so that the sheath is a one-piece device.

In operation, the root portion 66 can be positioned downstream of the exhaust section 22 and be subjected to combustion gases. The sheath 76 can therefore also be disposed in the path of the combustion gases. The sheath 76 can pivot in different, opposite directions about the height axis 64 of the blade 46. These directions are referenced at 112 and 114 in FIG. 2. The exemplary sheath 76 in FIG. 2 can pivot about the root portion 66 in response to the combustion gases. If the center of pressure forces acting on the sheath 76 is not behind the center of rotation along the direction of exhaust gas flow, the sheath 76 will "weathervane" to a neutral position in all operating conditions. In other words, the neutral position is reached when forces not parallel to the centerline axis 24 cancel one another. This movement will minimize any pressure gradients caused by fixed aerodynamic surfaces.

Embodiments of the invention can include at least one damper. FIG. 2 shows an exemplary damper 116 connected with both the root portion 66 and the shell portion 100 of the sheath 76. A first end 118 of the damper 116 can be connected for pivoting movement relative to the root portion 66. For example, a ring 120 can be fixedly mounted on the root portion 66. It is noted that based on the perspective of FIG. 2, the exemplary ring 120 is above (radially outward of) the bushing 84. The first end 118 can be pivotably mounted to a portion of the ring 120. The position of the pivot axis of the first end 118 is fixed. A second end 122 of the damper 116 can be connected for pivoting movement relative to the shell portion 100. During pivoting movement of the sheath 76, the distance between the first and second ends 118 and 122 changes because the first end 118 is fixed and the second end 122 rotates about a pivot axis (the central axis of the root portion 66 which is part of the height axis 64) that is spaced from the first end 118. The exemplary damper 116 is positioned inside the sheath 76 and can be connected to the blade 46 and half 80 before the two halves 78, 80 are assembled together. It is noted that other forms of dampers can be used in other embodiments of the invention. For example, rotary dampers can be used. Also, a damper can be positioned outside of the sheath in other embodiments of the invention.

Embodiments of the invention can include at least one biasing member. FIG. 3 shows a biasing member 124 interconnecting the sheath 76 and the at least one blade 46. The exemplary biasing member 124 can have a coil shape and act as a torsion spring. At a first end 126, the biasing member 124 can be fixed to the root portion 66. At a second end 128, the biasing member 124 can be fixed to the collar 88. The biasing member 124 can thus be positioned inside the sheath 76. It is noted that other forms of biasing devices can be used in other embodiments of the invention. Also, a biasing can be positioned outside of the sheath in other embodiments of the invention. It is noted that the damper 116 shown in FIG. 2 is not shown in FIG. 3 to improve the clarity in showing the biasing member 124.

Embodiments of the invention can include a movement-limiting member. FIG. 3 shows an exemplary movement-limiting member 130. The movement-limiting member 130 can be intermittently spaced from the sheath 76 and operable to limit movement of the sheath 76 in at least one direction. The movement-limiting member 130 is "intermittently spaced" in that sheath 76 and the movement-limiting member 130 can come into contact with one another when the sheath 76 pivots to a predetermined end limit of travel and be spaced from one another at other times during pivoting movement by the sheath 76. The exemplary movement-limiting member 130 can include a ring portion 132 fixed to the root portion 66. The exemplary movement-limiting member 130 can also include arms 134, 136 extending from the ring portion 132. Arm 136 is shown in FIG. 2. The movement-limiting member 132 is thus positioned inside the sheath 76.

Referring now to FIG. 2, when the sheath 76 pivots a predetermined amount in the direction referenced by arrow 112, the web 92 will contact the arm 136 and this interaction will prevent further movement in the direction referenced by arrow 112. When the sheath 76 pivots a predetermined amount in the direction referenced by arrow 114, the web 98 will contact the arm 134 and this interaction will prevent further movement in the direction referenced by arrow 114. The position of the sheath 76 about the root portion 66 when the web 92 contacts the arm 136 is a first end limit of travel and the position of the sheath 76 about the root portion 66 when the web 98 contacts the arm 134 is a second end limit of travel.

Figure 4:
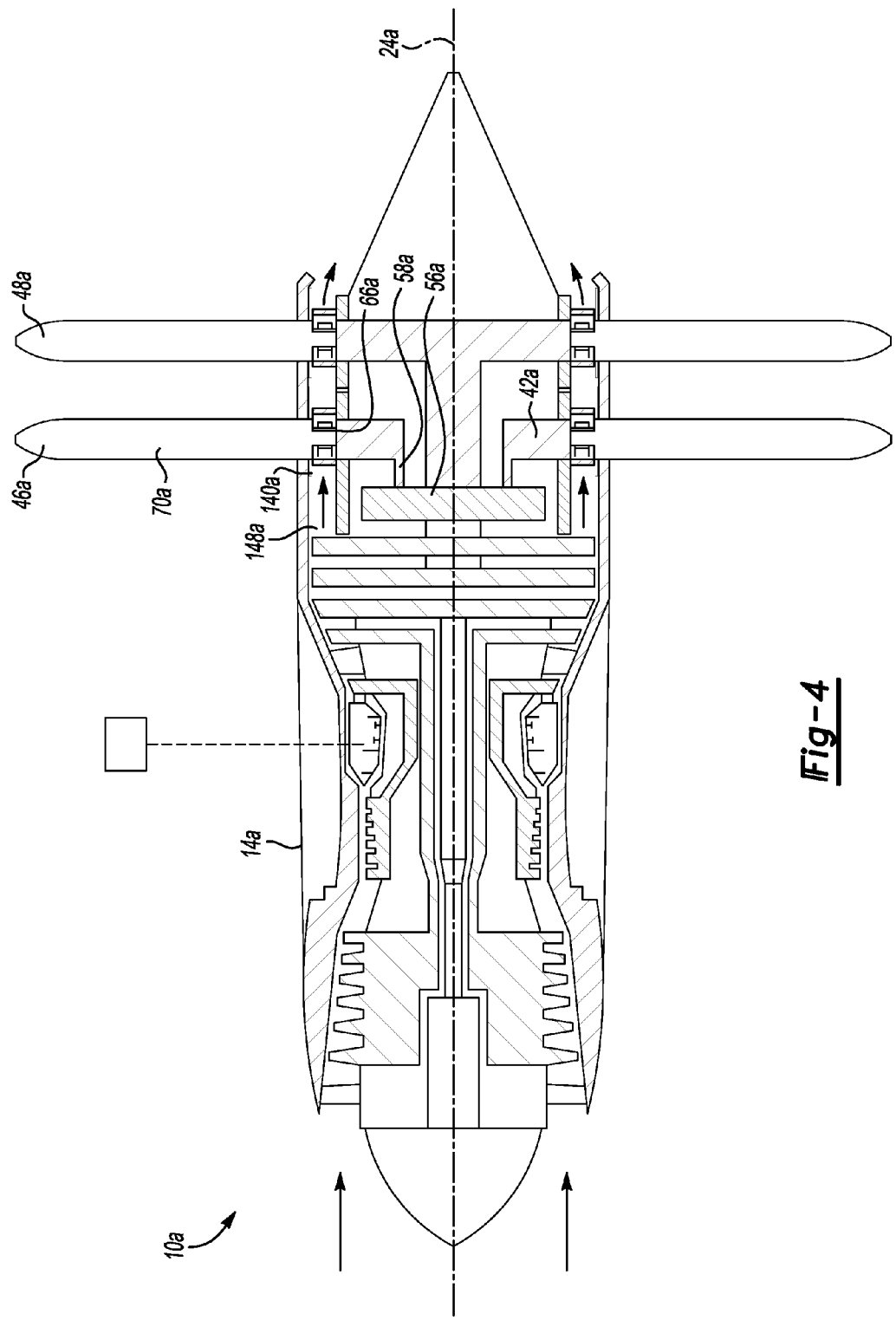
FIG. 4 is a schematic representation of a second turbine engine incorporating an exemplary embodiment of the invention.
Figure 5:
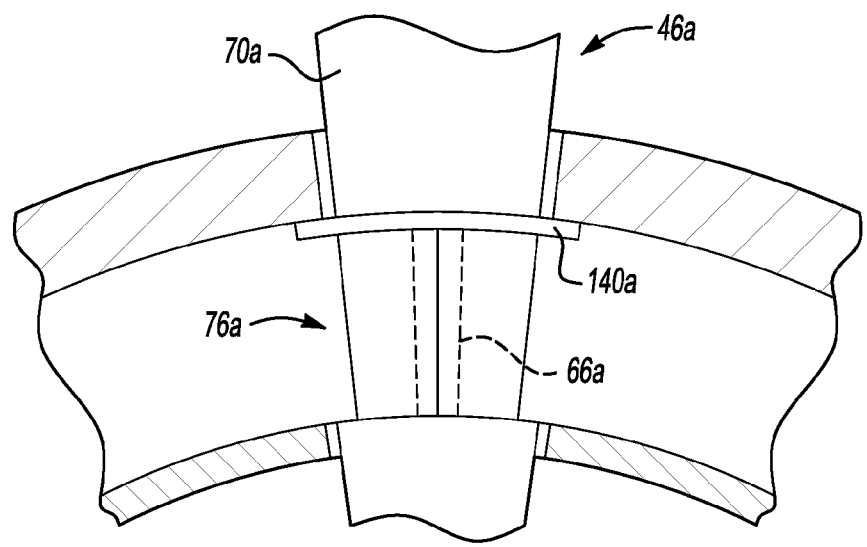
FIG. 5 is an aft-looking view within a turbine engine showing an embodiment of the invention.
Figure 6:
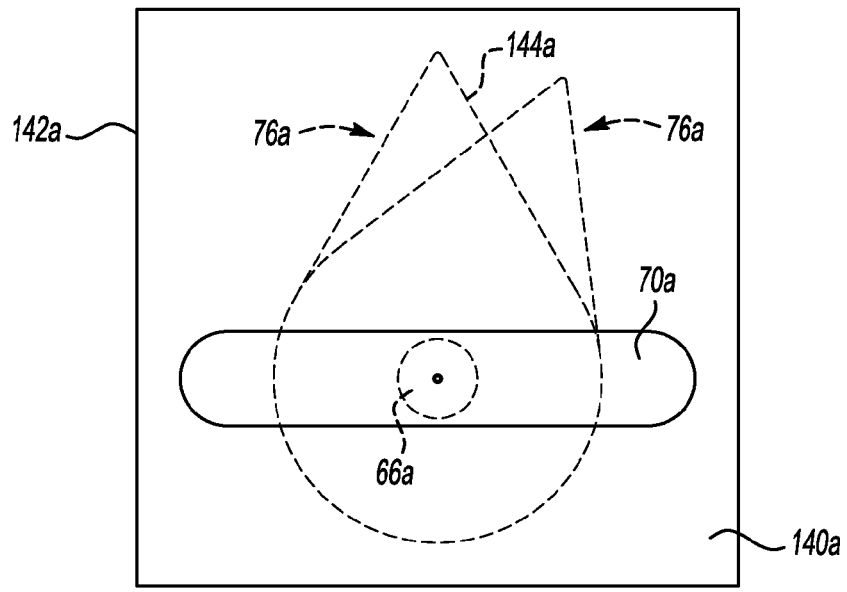
FIG. 6 is a cross-sectional view directed radially inward and taken through a sheath and blade according to an embodiment of the invention.

FIG. 4 shows a second embodiment of the invention applied in a turbine engine 10a having a sheath 76a. The turbine engine 10a is different that the turbine engine 10 in that for turbine engine 10 the engine exhaust is allowed to communicate with the outside airstream. In the turbine engine 10a, a duct 148a containing the engine exhaust extends aft beyond the last blade 48a along the centerline axis 24a, so the exhaust is segregated from the passing outside airstream, passing outside the nacelle 14a. The duct 148a can have a fixed geometry and at every condition other than at the sheath 76a. FIG. 5 is an aft-looking view of a second embodiment of the invention. The blade 46a can include an airfoil portion 70a driven in rotation by power directed through a gear box 56a, a drive shaft 58a, and a hub 42a. The sheath 76a is positioned around a root portion 66a of the blade 46a, in the path of exhaust gases (referenced by the unnumbered arrows on the left side of the drawing). The sheath 76a can include a platform 140a. If an undesirable gap is defined between a sheath 76a and the blade 46a, such that the gap becomes a source of noise due to shedding vortices, the platform 140a can be installed either adjacent to the hub 42a or adjacent to the airfoil portion 70a. The platform 140a can envelop the full expected travel of the sheath 76a in operation. This is best shown in FIG. 6 where a perimeter 142a of the platform 140a circumscribes a perimeter 144a of the sheath 76a. The sheath 76a is shown in phantom in two different positions.

Embodiments of the invention can include a cooling fluid delivery system operable to bleed fluid from the compressor section and route the fluid to a gap between the sheath 76 and the blade 46. FIG. 3 shows that one or more gaps can be defined between the sheath 76 and the blade 46. For example, the length of the root portion 66 encircled by the biasing device 124 is a gap between the sheath 76 and the blade 46. FIG. 2 shows that the sheath 76 can itself define gaps or voids. The interior cavity defined by gaps between the sheath 76 and blade 46 and also defined only sheath 76 can be filled with air bled from the compressor section 14 in order to cool at least a portion of the blade 46 from the exhaust gases. The fluid from the compressor section can be directed through the shaft 26, the drive shaft 58, and the hub 42. The gap between the sheath 76 and the blade 46 can be as large as desired. Also, the gap could be filled with insulation. Alternatively, the sheath 76 could be solid in alternative embodiments of the invention, with no substantial air cavity between the blade 46 and the sheath 76. The cooling fluid can be exhausted from a trailing edge of the sheath 76 to minimize wake formation and thereby reduce noise generation. The trailing edge of the sheath 76 can be adjacent to the bosses 104 and 108.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

Embodiments of the invention can include a cooling fluid delivery system operable to bleed fluid from the compressor section and route the fluid to a gap between the sheath 76 and the blade 46. FIG. 3 shows that one or more gaps can be defined between the sheath 76 and the blade 46. For example, the length of the root portion 66 encircled by the biasing device 124 is a gap between the sheath 76 and the blade 46. FIG. 2 shows that the sheath 76 can itself define gaps or voids. The interior cavity defined by gaps between the sheath 76 and blade 46 and also defined only sheath 76 can be filled with air bled from the compressor section 14 in order to cool at least a portion of the blade 46 from the exhaust gases. The fluid bled from the compressor section can be directed through the shaft 54, the drive shaft 58, the hub 42 and exhausted from a trailing edge of said sheath 76 as schematically depicted by arrowed line 99 in FIG. 1. The gap between the sheath 76 and the blade 46 can be as large as desired. Also, the gap could be filled with insulation. Alternatively, the sheath 76 could be solid in alternative embodiments of the invention, with no substantial air cavity between the blade 46 and the sheath 76. The cooling fluid can be exhausted from a trailing edge of the sheath 76 to minimize wake formation and thereby reduce noise generation. The trailing edge of the sheath 76 can be adjacent to the bosses 104 and 108.

What is claimed is:

1. A rotor assembly comprising:
a hub disposed for rotation about an axis of rotation;
at least one blade fixed with said hub for concurrent rotation with said hub, said at least one blade extending along a height axis radially outward from said hub with a root portion proximate to said hub at a first end of said height axis and an airfoil portion extending radially inward from a second end of said height axis opposite said first end;
a sheath extending at least partially around said root portion and being pivotally engaged with said at least one blade to pivot about said height axis to weathervane to a neutral position in all operating conditions;
at least one damper connected with and operable to dampen pivoting movement of said sheath about said height axis, said at least one damper is positioned inside said sheath; and
at least one biasing member connected with and operable to bias said sheath, said at least one biasing member is positioned inside said sheath.

2. The rotor assembly of claim 1 further comprising:
at least one movement-limiting member intermittently spaced from said sheath and operable to limit movement of said sheath in at least one direction.

3. The rotor assembly of claim 2 wherein said at least one movement-limiting member is positioned inside said sheath.

4. The rotor assembly of claim 1 further comprising:
a plate member positioned between said sheath and said airfoil portion along said height axis, said plate member having a first perimeter in a first plane substantially normal to said height axis and said sheath having a second perimeter in a second plane substantially normal to said height axis and substantially parallel to said first plane, wherein said first perimeter is larger than said second perimeter.

5. The rotor assembly of claim 4 wherein said first perimeter circumscribes said second perimeter.

6. The rotor assembly of claim 1 wherein said sheath includes first and second halves respectively mountable on opposite sides of said root portion.

7. A method for reducing noise generated by a propeller comprising the steps of:
substantially centering a hub for rotation about an axis of rotation;
fixing at least one blade with the hub for concurrent rotation, the at least one blade extending along a height axis radially outward from the hub with a root portion proximate to the hub at a first end of the height axis and an airfoil portion extending radially inward from a second end of the height axis opposite the first end;
extending a sheath at least partially around the root portion to be pivotally engaged with the at least one blade for pivoting movement about the height axis to weathervane to a neutral position in all operating conditions;
installing a damper that extends internal to the sheath between the sheath and the at least one blade; and
biasing the sheath to a predetermined position with a spring located internal to the sheath and that interconnects the sheath and the at least one blade.

8. The method of claim 7 further comprising the step of limiting movement of the sheath between first and second end limits of travel with first and second projections fixed to the at least one blade.

9. An aircraft propulsion device comprising:
a compressor section;
a combustor section operable to receive compressed fluid from said compressor section;
a turbine section operable to receive combustion gases from said combustor section;
an exhaust section operable to receive combustion gases from said turbine section;
including:
a rotor assembly positioned downstream of said exhaust section and a hub disposed for rotation about an axis of rotation;
at least one blade fixed with said hub for concurrent rotation with said hub, said at least one blade extending along a height axis radially outward from said hub with a root portion proximate to said hub at a first end of said height axis and an airfoil portion extending radially inward from a second end of said height axis opposite said first end, wherein said root portion is downstream of said exhaust section and is subjected to combustion gases;
a sheath extending at least partially around said root portion and being pivotally engaged with said at least one blade to pivot about said height axis, wherein said sheath is disposed in a path of the combustion gases and is operable to pivot in response to the combustion gases to weathervane to a neutral position in all operating conditions;
a torsion spring configured around the at least one blade and connected between the sheath and the at least one blade; and
a damper connected between the sheath and the at least one blade.

10. The aircraft propulsion device of claim 9 wherein said sheath defines an external surface of said aircraft propulsion device.

11. The aircraft propulsion device of claim 9 wherein said sheath is positioned internally of an outer surface of said aircraft propulsion device.

12. The aircraft propulsion device of claim 9 further comprising:
a bushing positioned between said sheath and said at least one blade.

13. The aircraft propulsion device of claim 9 further comprising:
a cooling fluid delivery system operable to bleed fluid from said compressor section and route the fluid to said sheath, in a gap between said sheath and said at least one blade, to cool said sheath and said at least one blade.

14. The aircraft propulsion device of claim 13 wherein said fluid is exhausted from a trailing edge of said sheath to minimize wake formation and thereby reduce noise.

15. The aircraft propulsion device of claim 9 wherein said exhaust section is further defined as one of an annular exhaust and a lobed exhaust.

* * * * *